US009812055B2

(12) United States Patent
Jung et al.

(10) Patent No.: US 9,812,055 B2
(45) Date of Patent: Nov. 7, 2017

(54) DISPLAY DEVICE AND A METHOD FOR DRIVING THE SAME

(71) Applicant: Samsung Display Co., Ltd., Yongin-si, Gyeonggi-do (KR)

(72) Inventors: Jae Hoon Jung, Anyang-si (KR); Dan Bi Yang, Gunpo-si (KR); Ji Phyo Hong, Pyeongtaek-si (KR); Ki Chul Shin, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 117 days.

(21) Appl. No.: 14/856,044

(22) Filed: Sep. 16, 2015

(65) Prior Publication Data

US 2016/0217725 A1    Jul. 28, 2016

(30) Foreign Application Priority Data

Jan. 23, 2015    (KR) .................. 10-2015-0011565

(51) Int. Cl.
*G09G 5/10* (2006.01)
*G09G 3/20* (2006.01)
*G02F 1/1343* (2006.01)
*G09G 3/36* (2006.01)

(52) U.S. Cl.
CPC ..... *G09G 3/2022* (2013.01); *G02F 1/134309* (2013.01); *G09G 3/2074* (2013.01); *G09G 3/3685* (2013.01); *G02F 2201/40* (2013.01); *G09G 2300/0439* (2013.01); *G09G 2300/0465* (2013.01); *G09G 2300/0478* (2013.01); *G09G 2320/0271* (2013.01); *G09G 2320/068* (2013.01)

(58) Field of Classification Search
CPC ............ G02F 1/1337; G02F 1/133753; G02F 1/134336; G02F 1/13624
USPC ................................ 349/123, 130, 141, 144
See application file for complete search history.

(56) References Cited

U.S. PATENT DOCUMENTS

| 7,965,363 B2* | 6/2011 | Takeda | G02F 1/133707 349/130 |
| 2012/0281172 A1* | 11/2012 | Park | G02F 1/133707 349/123 |
| 2013/0335308 A1* | 12/2013 | Hsu | G09G 3/3648 345/92 |
| 2014/0253859 A1* | 9/2014 | Yoon | G02F 1/134336 349/144 |

FOREIGN PATENT DOCUMENTS

| KR | 1020080032768 A | 4/2008 |
| KR | 1020100029028 A | 3/2010 |
| KR | 1020130025066 A | 3/2013 |
| KR | 1020140000589 A | 1/2014 |
| KR | 1020140021105 A | 2/2014 |

* cited by examiner

*Primary Examiner* — Calvin C Ma
(74) *Attorney, Agent, or Firm* — Innovation Counsel LLP

(57) ABSTRACT

A display device includes: a common electrode and a pixel electrode that includes a horizontal stem, a vertical stem, and a branch. A pixel of the branch includes a first branch that extends in a first diagonal direction from the horizontal stem and the vertical stem, and a second branch that extends in a second diagonal direction from the horizontal stem and the vertical stem.

14 Claims, 7 Drawing Sheets

DISPLAY DEVICE AND A METHOD FOR DRIVING THE SAME

CROSS-REFERENCE TO RELATED APPLICATION

This application claims priority to and the benefit of Korean Patent Application No. 10-2015-0011565 filed in the Korean Intellectual Property Office on Jan. 23, 2015, the disclosure of which is incorporated herein by reference, in its entirety.

BACKGROUND (a) Field

The present disclosure relates to a display device and a method for driving the same, and more particularly, to a liquid crystal display device and a method for driving the same.

(b) Description of the Related Art

A liquid crystal display is one of the most widely used flat panel displays at present. Generally, a liquid crystal display includes two display panels including field generating electrodes such as a pixel electrode and a common electrode, and a liquid crystal layer interposed therebetween. The liquid crystal display generates an electric field in the liquid crystal layer by applying a voltage to the field generating electrodes. The alignment of liquid crystal molecules of the liquid crystal layer changes through the generated electric field and the liquid crystal display displays images by controlling polarization of incident light. The liquid crystal display also includes a switching element that is connected to each pixel electrode, and a plurality of signal lines such as a gate line and a data line for applying a voltage to the pixel electrode by controlling the switching element.

Among various types of liquid crystal displays, a vertically aligned mode liquid crystal display uses long axes of liquid crystal molecules. The liquid crystal modules are aligned to be vertical to upper and lower display panels when no electric field is applied, but their alignment changes when an electric field is applied. The vertically aligned mode liquid crystal display has a large contrast and a wide reference viewing angle. For example, the reference viewing angle indicates a viewing angle in which the contrast ratio is 1:10 or a luminance inversion limit angle between grays.

The wide reference viewing angle in the vertically aligned mode liquid crystal display may be achieved by forming a cut portion in the electric field generating electrode and forming protrusions above or below the electric field generating electrode. Since the cut portion and the protrusions determine a tilt direction of the liquid crystal molecules, the cut portion and the protrusions are appropriately placed to scatter the tilt direction of the liquid crystal molecules in various directions, thereby widening the reference viewing angle.

Further, a front visibility of the vertically aligned mode liquid crystal display is typically lower than a side visibility. For example, in the case of a patterned vertically aligned mode liquid crystal display with a cut portion, an image becomes brighter toward the side, and as a result, when the image is too bright, there is no difference in luminance between high grays. As a result, a picture may look distorted.

In an effort to approximate a side visibility to a front visibility of a vertically aligned mode liquid crystal display, a method for varying transmittance by dividing one pixel into two subpixels and applying different voltages of the two subpixels was proposed. However, when one pixel is divided into two subpixels, and the side visibility is approximated to the front visibility by varying transmittance, luminance is increased at a low gray or a high gray, and a gray expression at the side becomes difficult. As a result, an image quality may deteriorate. Further, when the transmittance variation is not definite with variation in gray, the gray variation cannot be displayed. As a result, the image quality may also deteriorate. In general, when one pixel is divided into two subpixels, the transmittance is decreased by an interval between the two subpixels.

The above information disclosed in this background section is only for facilitating understanding of the background information of the present disclosure, therefore it may contain information that does not form a prior art that is already known to a person of ordinary skill in the art.

SUMMARY

The present disclosure has been made in an effort to provide a high-resolution display device having an improved aperture ratio and/or transmittance with enhanced visibility.

The present disclosure has also been made in an effort to approximate a side visibility to a level of a front visibility by dividing a driving unit into two pixels having different voltages and spatially dividing and driving the two pixels.

The present disclosure has also been made in an effort to approximate a side visibility to a level of a front visibility in a high gray and a low gray by temporally dividing and driving a driving unit.

Further, other technical objects desired to be achieved in the present disclosure are not limited to the aforementioned objects, and other technical objects not described above will be apparent to those skilled in the art from the disclosure of the present disclosure.

An exemplary embodiment of the present disclosure provides a display device including: a common electrode and a pixel electrode that includes a horizontal stem, a vertical stem, and a branch. A pixel of the branch includes: a first branch that extends in a first diagonal direction from the horizontal stem and the vertical stem; and a second branch that extends in a second diagonal direction from the horizontal stem and the vertical stem.

The display device may further include a liquid crystal layer positioned between the common electrode and the pixel electrode and including a plurality of liquid crystal molecules, and an electric field corresponding to a difference between the common voltage that is applied to the common electrode and the data voltage that is applied to the pixel electrode may be formed in the liquid crystal layer, and the plurality of liquid crystal molecules may be aligned in a direction according to the electric field.

The branch may further include, a first domain in which the plurality of liquid crystal molecules corresponding to the first branch are laid in the first diagonal direction, and a second domain in which the plurality of liquid crystal molecules corresponding to the second branch are laid in the second diagonal direction.

The pixel may include a first pixel and a second pixel. A first group of liquid crystal molecules of the first pixel and a second group of liquid crystal molecules of the second pixel may be bilaterally symmetric to each other. The first pixel may be connected to a first data line, and the second pixel may be connected to a second data line.

A one frame period may include a first subframe period and a second subframe period. The first pixel may be applied with a first data voltage during the first subframe period and a third data voltage during the second subframe period, while the second pixel may be applied with a fourth data voltage during the first subframe period and a second data voltage during the second subframe period. The first data voltage and the second data voltage may be positive voltages higher than the common voltage and the third data voltage and the fourth data voltage may be negative voltages lower than the common voltage.

A high-gray image may be displayed during the first subframe period, and a low-gray image may be displayed during the second subframe period.

The pixel may include a first pixel and a second pixel. A first group of liquid crystal molecules of the first pixel and a second group of liquid crystal molecules of the second pixel may be vertically symmetric to each other. The first pixel may be connected to a second data line, the second pixel may be connected to a first data line. During one frame period, a first data voltage may be applied to the first pixel from the second data line according to a first gate signal, and a second data voltage may be applied to the second pixel from the first data line according to a second gate signal.

A size of the pixel may be 100 μm wide and 300 μm long.

Another exemplary embodiment of the present disclosure provides a method for driving a display device. The display device includes a common electrode and a pixel electrode that includes a horizontal stem, a vertical stem, and a branch. The branch includes a pixel including: a first branch that extends in a first diagonal direction from the horizontal stem and the vertical stem; and a second branch that extends in a second diagonal direction from the horizontal stem and the vertical stem. The method includes: applying a common signal to the common electrode; and applying a data voltage to the pixel electrode.

The method may further include: wherein the display device includes a liquid crystal layer positioned between the common electrode and the pixel electrode and including a plurality of liquid crystal molecules, forming in the liquid crystal layer an electric field corresponding to a difference between the common voltage and the data voltage; and aligning the plurality of liquid crystal molecules in a predetermined direction according to the electric field.

The branch may include, a first domain in which the plurality of liquid crystal molecules corresponding to the first branch are laid in the first diagonal direction, and a second domain in which the plurality of liquid crystal molecules corresponding to the second branch are laid in the second diagonal direction.

The pixel may include a first pixel and a second pixel.

A first group of liquid crystal molecules of the first pixel and a second group of liquid crystal molecules of the second pixel may be bilaterally symmetric to each other. The first pixel is connected to a first data line, and the second pixel is connected to a second data line.

The method may further include, during a first subframe period of one frame period, applying a first data voltage to the first pixel; and applying a fourth data voltage to the second pixel, and during a second subframe period of the one frame period, applying a third data voltage to the first pixel; and applying a second data voltage to the second pixel. The first data voltage and the second data voltage may be positive voltages higher than the common voltage and the third data voltage and the fourth data voltage may be negative voltages lower than the common voltage.

The method may further include: displaying a high-gray image during the first subframe period; and displaying a low-gray image during the second subframe period.

The method may further include: wherein the pixel may include a first pixel and a second pixel, a first group of liquid crystal molecules of the first pixel and a second group of liquid crystal molecules of the second pixel may be vertically symmetric to each other, the first pixel may be connected to a second data line, and the second pixel may be connected to a first data line, during one frame period, applying a first data voltage to the first pixel from the second data line according to a first gate signal, and applying a second data voltage to the second pixel from the first data line according to a second gate signal.

The size of the pixel may be 100 μm wide and 300 μm long.

According to exemplary embodiments of the present disclosure, a display device can prevent deterioration of transmittance that may occur in an area between the common electrode and the pixel electrode by dividing one pixel into a plurality of areas.

Further, a driving unit is divided into two pixels having different data voltages, and the two pixels are divided and driven to approximate a side visibility to a front visibility.

The driving unit may be temporally divided and driven to approximate the side visibility to the front visibility in a high gray and a low gray.

DETAILED DESCRIPTION OF THE EMBODIMENTS

Figure 1:
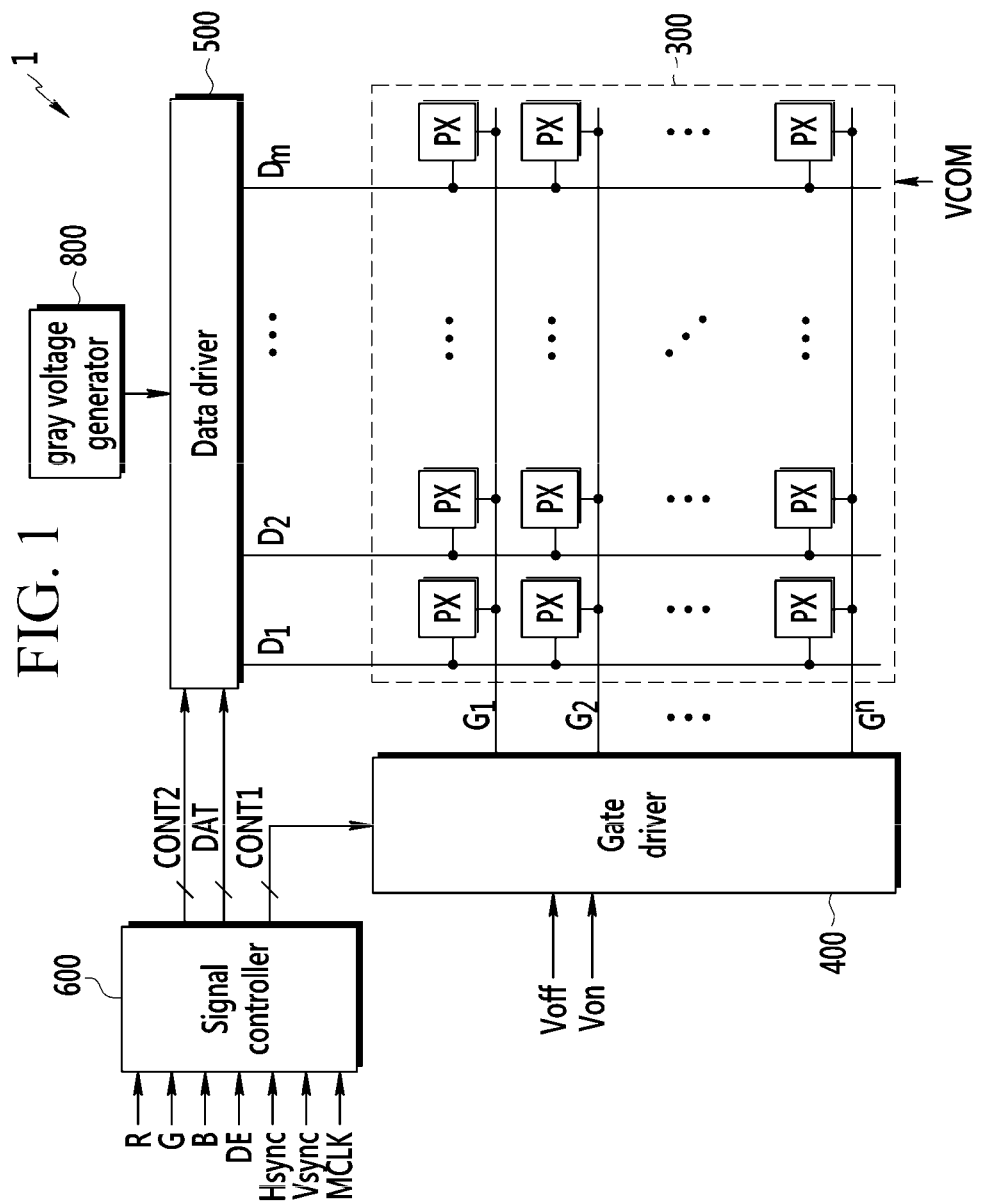
FIG. 1 is a block diagram of a display device, according to an exemplary embodiment.

Hereinafter, exemplary embodiments disclosed in the present specification will be described in detail with reference to the accompanying drawings, in which like or similar reference numerals refer to like or similar elements, and a duplicated description thereof will be omitted. "Module" and "unit" that are suffixes for the components used in the following description are granted or mixed by considering only easiness in preparing the specification and do not have meanings or roles distinguished from each other in themselves. In describing the exemplary embodiments disclosed in the specification, when it is determined that the detailed description of the publicly known art related to the present disclosure covers the gist of the exemplary embodiments disclosed in the specification, the detailed description thereof may be omitted. Further, the accompanying drawings are intended for easy understanding the exemplary embodiments disclosed in the specification, the technical spirit disclosed in the specification is not limited by the accompanying drawings, and it should appreciated that the accompanying drawings include all changes, equivalents, or substitutions included in the spirit and the technical scope of the present disclosure.

Terms including an ordinal number such as first or second may be used to describe various components, but the components are not limited by the above terms. The above terms are used to discriminate one component from another component.

It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there may be no intervening elements. Singular expressions used herein include plurals expressions unless they have definitely opposite meanings in the context.

In the present specification, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations, in advance.

Figure 2:
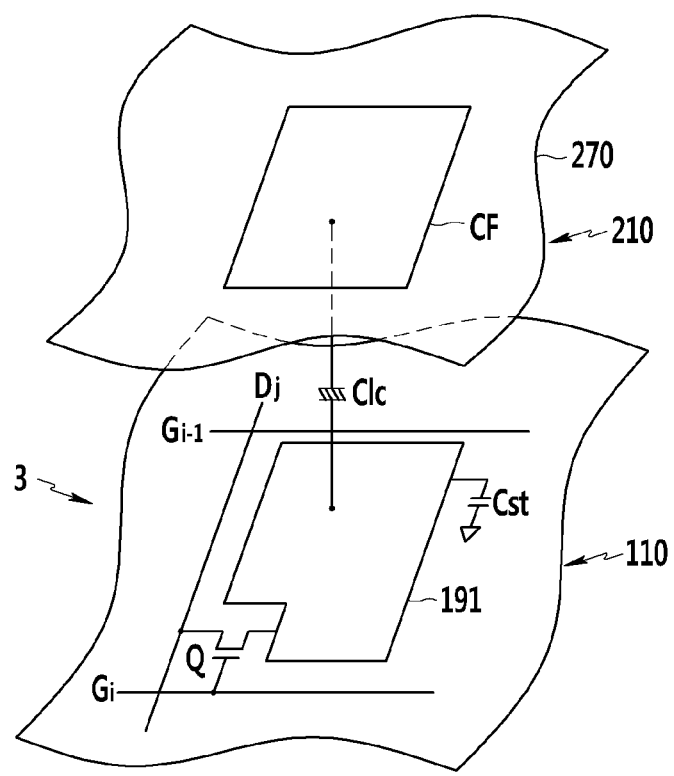
FIG. 2 is an equivalent circuit diagram of a pixel, according to the exemplary embodiment.

FIG. 1 is a block diagram of a display device, according to an exemplary embodiment. FIG. 2 is an equivalent circuit diagram of a pixel, according to the exemplary embodiment.

The display device 1 according to the exemplary embodiment of the present disclosure includes a display unit 300, a gate driver 400, a data driver 500, a gray voltage generator 800, and a signal controller 600 that is configured to control the gate driver 400 and the data driver 500. The display unit 300 includes a plurality of signal lines G1-Gn and D1-Dm, and a plurality of pixels PX that are connected to the signal lines and arranged substantially in a matrix. The display unit 300 includes a first substrate 110 and a second substrate 210 facing each other, and a liquid crystal layer 3 that is interposed between the first substrate 110 and the second substrate 120.

The signal lines $G_1$-$G_n$, and $D_1$-$D_m$ include a plurality of gate lines $G_1$-$G_n$ transferring gate signals (also referred to as "scanning signals"), and a plurality of data lines $D_1$-$D_m$ transferring data voltages. The gate lines $G_1$-$G_n$, extend substantially in a row direction and are substantially parallel to each other, and the data lines $D_1$-$D_m$ extend substantially in a column direction and are substantially parallel to each other.

Each pixel PX, for example, a pixel PX connected to an i-th (i=1, 2, . . . , n) gate line $G_i$ and a j-th (j=1, 2, . . . , m) data line $D_j$ includes a switching element Q that is connected to the signal lines $G_i$ and $D_j$, and a liquid crystal capacitor Clc and a storage capacitor Cst connected thereto. The storage capacitor Cst may be omitted if necessary.

The switching element Q is a semiconductor 154 (see FIGS. 3 and 4) such as a thin film transistor, and a gate electrode 124 is connected with the gate line $G_i$, a source electrode 173 (see FIGS. 3 and 4) is connected with the data line $D_j$, and a drain electrode 175 (see FIGS. 3 and 4) is connected with the liquid crystal capacitor Clc and the storage capacitor Cst.

The liquid crystal capacitor Clc has a pixel electrode 191 of the first substrate 110 and the common electrode 270 of the second substrate 210 as two terminals, and the liquid crystal layer 3 between the pixel electrode 191 and the common electrode 270 serves as a dielectric material. The pixel electrode 191 is connected with the switching element Q, and the common electrode 270 is formed on the entire surface of the second substrate 210 to receive a common voltage Vcom. According to some embodiments, the common electrode 270 may be provided on the first substrate 110, and at least one of the two electrodes 191 and 270 may be formed in a linear shape or a rod shape.

The storage capacitor Cst that plays a subordinate role of the liquid crystal capacitor Clc is formed by overlapping a separate signal line (not illustrated) included in the first substrate 110 and the pixel electrode 191 with an insulator interposed therebetween, and a predetermined voltage such as the common voltage Vcom may be applied to the separate signal line. The storage capacitor Cst may be formed by overlapping the pixel electrode 191 and a previous gate line immediately above by the insulator.

To implement color display, each pixel PX uniquely displays one of primary colors (a spatial division) or alternately displays the primary colors with time (a temporal division) so that a desired color is recognized by the spatial and temporal sum of the primary colors. Examples of the primary colors may include red, green, and blue. FIG. 2 illustrates that each pixel PX includes a color filter 230 representing one of the primary colors in an area of the second substrate 210 that corresponds to the pixel electrode 191, as an example of the spatial division. At least one polarizer (not illustrated) that polarizes light is attached onto an outer surface of the display unit 300.

Referring back to FIG. 1, the gray voltage generator 800 generates two gray voltage sets (alternatively, a reference gray voltage set) related with transmittance of the pixel PX. One set of the two gray voltage sets has a positive value with respect to the common voltage Vcom, and the other set has a negative value.

The gate driver 400 is connected to the gate lines G1-Gn and applies gate signals configured by a combination of a gate-on voltage Von and a gate-off voltage Voff to the gate lines G1-Gn. The data driver 500 is connected to the data lines D1-Dm, selects gray voltages from the gray voltage generator 800, and applies the selected gray voltages to the data lines D1-Dm as data voltages. However, in the case where the gray voltage generator 800 provides only a predetermined number of reference gray voltages, the data driver 500 generates gray voltages for all grays by dividing the predetermined number of reference gray voltages and selects the data voltages from the gray voltages.

The signal controller 600 controls the gate driver 400 and the data driver 500. Each of the driving devices 400, 500, 600, and 800 may be directly mounted on the display unit 300 in at least one IC chip form, mounted on a flexible printed circuit film (not illustrated), attached to the display unit 300 in a tape carrier package (TCP) form, or mounted on a separate printed circuit board (not illustrated). In some embodiments, the driving devices 400, 500, 600, and 800 may be integrated on the display unit 300 together with the signal lines G1-Gn and D1-Dm, and a thin film transistor switching element Q. Further, the driving devices 400, 500, 600, and 800 may be integrated by a single chip, and at least one of the driving devices or at least one circuit element configuring the driving devices may be positioned outside of the single chip.

Hereinafter, an operation of the display unit 300 will be described in detail. The signal controller 600 receives input image signals R, G, and B and an input control signal for controlling the input image signals R, G, and B received from an external graphic controller (not illustrated). The input image signals R, G and B store luminance information of each pixel PX, and luminance has a predetermined number of gray values, for example, 1024 ($=2^{10}$), 256 ($=2^8$), or 64 ($=2^6$) gray values. An example of the input control signal includes a vertical synchronization signal Vsync and a horizontal synchronization signal Hsync, a main clock MCLK, and a data enable signal DE. The signal controller 600 properly processes the input image signals R, G, and B in accordance with an operational condition of the display panel 300 based on the input image signals R, G, and B and the input control signal, and generates a gate control signal CONT1 and a data control signal CONT2, applies the gate control signal CONT1 to the gate driver 400, and applies the data control signal CONT2 and a processed image signal DAT to the data driver 500. The output image signal DAT has a predetermined number of gray values as a digital signal.

The gate control signal CONT1 includes a scanning start signal STV instructing a scanning start and at least one clock signal controlling an output period of the gate-on voltage Von. The gate control signal CONT1 may also further include an output enable signal limiting a duration of the gate-on voltage Von.

The data control signal CONT2 includes a horizontal synchronization signal Hsync instructing an input start of the image signal DAT for pixels PX in one row and a load signal instructing application of corresponding data voltages (for example, data voltages) to the data lines D1-Dm. The data control signal CONT2 may also further include a reversion signal reversing a voltage polarity of the data voltage (hereinafter, referred to as a "polarity of the data voltage" by shortening a "polarity of the data voltage for the common voltage") for the common voltage Vcom.

According to the data control signal CONT2, the data driver 500 receives the digital image signal DAT for pixels PX in one row and selects a gray voltage corresponding to each digital image signal DAT to convert the digital image signal DAT into an analog data voltage and applies the converted analog data voltage to the corresponding data lines $D_1$-$D_m$. The gate driver 400 applies the gate-on voltage Von to the gate lines $G_1$-$G_n$, according to the gate control signal CONT1 to turn on the switching elements Q that is connected to the gate lines $G_1$-$G_n$. Then, the data voltages applied to the data lines $D_1$-$D_m$ are applied to the corresponding pixels PX through the turned-on switching elements Q.

A difference between the data voltage applied to the pixel PX and the common voltage Vcom is represented as a charging voltage of the liquid crystal capacitor Clc, that is, a pixel voltage. The alignment of liquid crystal molecules varies according to the pixel voltage, and as a result, the polarization of light passing through the liquid crystal layer 3 is changed. The change in polarization is represented as a change in transmittance of light by a polarizer attached to the display panel assembly 300, and as a result, the pixel PX displays luminance expressed by a gray value of the image signal DATA.

The process is repeated by setting 1 horizontal period (referred to as "1H", and being the same as one period of the horizontal synchronization signal Hsync) by a unit, and as a result, the gate-on voltages Von are sequentially applied to all the gate lines $G_1$-$G_n$, and the data voltages are applied to all the pixels PX, thereby displaying images for one frame. After one frame ends, the next frame starts, and a state of the reversion signal RVS applied to the data driver 500 is controlled so that the polarity of the data voltage applied to each pixel PX is opposite to the polarity in the previous frame ("frame reversion"). In this case, even within one frame period, a polarity of data that flows through one data line is not changed according to a characteristic of a reversion signal, and polarities of data that flow through contiguous data lines are opposite to each other (column reversion). Reversion driving according to the exemplary embodiment will be described later in detail.

Figure 3:
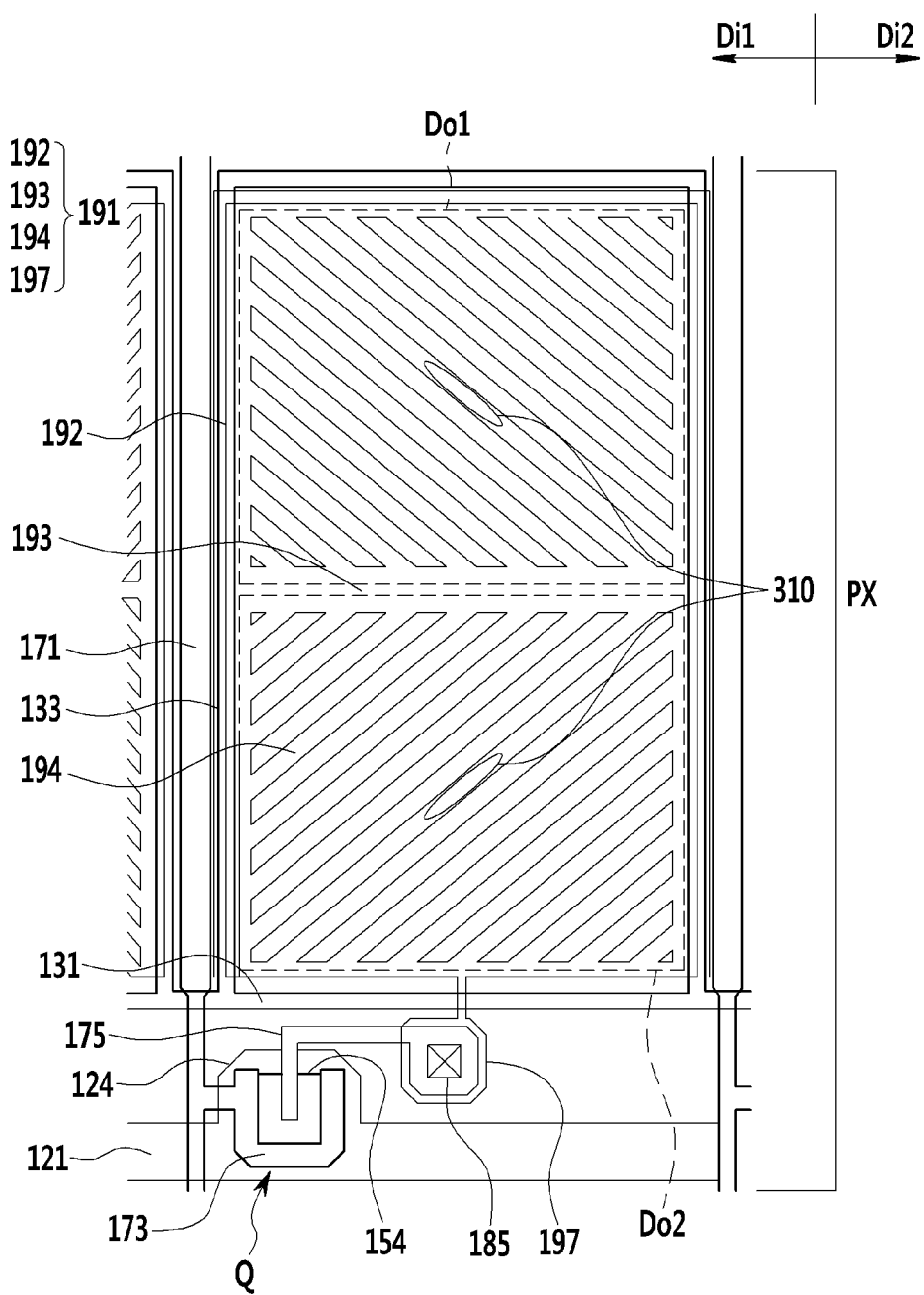
FIG. 3 is a plan view illustrating the pixel, according to the exemplary embodiment.
Figure 4:
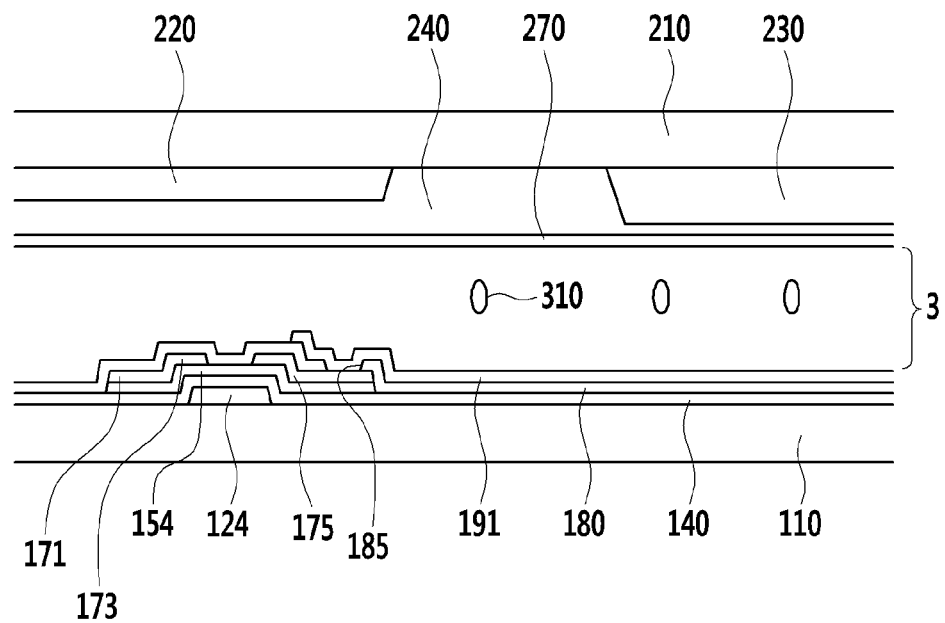
FIG. 4 is a cross-sectional view of the pixel, according to the exemplary embodiment.

FIG. 3 is a plan view illustrating the pixel, according to the exemplary embodiment. FIG. 4 is a cross-sectional view of the pixel, according to the exemplary embodiment. Hereinafter, the pixel according to the exemplary embodiment will be described with reference to FIGS. 3 and 4.

As illustrated in FIG. 3, the pixel PX of the display unit 300 includes a first domain Do1 and a second domain Do2. In the pixel PX, the first domain Do1 is positioned above a horizontal line and the second domain Do2 is positioned below the horizontal line.

As illustrated in FIGS. 3 and 4, the display unit 300 includes a first substrate 110 and a second substrate 210 facing each other, and a liquid crystal layer 3 interposed between the first substrate 110 and the second substrate 210. The first substrate 110 and the second substrate 210 may be made of glass or plastic. The liquid crystal layer 3 includes liquid crystal molecules 310 of a positive type or a negative type.

A light source (not illustrated) may be placed on a rear surface of the first substrate 110. The light source may include a light emitting diode (LED), and light is supplied from the light source. A direction of the liquid crystal molecules 310 of the liquid crystal layer 3 is determined according to an electric field formed between the first substrate 110 and the second substrate 210, and the amount of light that passes through the liquid crystal layer 3 varies depending on the direction of the liquid crystal molecules 310. A plurality of color filters 230 is positioned on the second substrate 210. The plurality of color filters 230 may be blue, green, and red filters, but the exemplary embodiment is not limited thereto.

A gate line 121 and a storage electrode line 131 are formed on the first substrate 110. The gate electrode 124, the semiconductor 154, the source electrode 173, the drain electrode 175, and a passivation layer 180 are formed on the first substrate 110, and the color filters 230 are positioned on the passivation layer 180. An overcoat 182 is formed on the passivation layer 180, and the pixel electrode 191 is formed on the overcoat 182.

The gate line 121 mainly extends in a horizontal direction and transfers a gate signal. Further, a gate electrode 124 that protrudes from the gate line 121 is formed. A storage electrode line 131 extends in a direction parallel to the gate line 121 (e.g., a horizontal direction) and transfers a predetermined voltage such as the common voltage. A storage electrode 133 is formed to extend from the storage electrode line 131.

A gate insulating layer 140 is formed on the gate line 121, the gate electrode 124, the storage electrode line 131, and the storage electrode 133. The gate insulating layer 140 may be made of an inorganic insulating material such as silicon nitride (SiNx) and silicon oxide (SiOx). Further, the gate insulating layer 140 may be formed as a single layer or a multilayer.

A semiconductor layer 154 is formed on the gate insulating layer 140. The semiconductor layer 154 is overlapped with the gate electrode 124. The semiconductor 154 may be made of amorphous silicon, polycrystalline silicon, metal oxide, or the like.

An ohmic contact member (not illustrated) may be further formed on the semiconductors 154. The ohmic contact member may also be made of a material such as n+ hydrogenated amorphous silicon in which an n-type impurity is doped at a high concentration.

A date line 171, a source electrode 173, and a drain electrode 175 are formed on the semiconductor 154. The source electrode 173 protrudes from the data line 171, and the drain electrode 175 is separated from the source electrode 173. The source electrode 173 and the drain electrode 175 overlap with the gate electrode 124.

The gate electrode 124, the source electrode 173, and the drain electrode 175 form one switching element Q together with the semiconductor 154, and a channel of the switching element Q is formed in the semiconductor 154 between the source electrode 173 and the drain electrode 175.

A passivation layer 180 is formed on the data line 171, the source electrode 173, the drain electrode 175, and an exposed portion of the semiconductor 154. A contact hole 185 exposing at least a part of the drain electrode 175 is formed in the passivation layer 180. The overcoat 182 is formed on the passivation layer 180 and the color filters 230, and the pixel electrode 191 is formed on the overcoat 182.

The pixel electrode 191 may be made of a transparent metal material such as indium tin oxide (ITO) and indium zinc oxide (IZO). According to one embodiment, the pixel electrode 191 has substantially a quadrangular shape. The pixel electrode 191 includes a horizontal stem 193 and a vertical stem 192 that crosses the horizontal stem 193. Further, the pixel electrode 191 further includes a minute branch 194 that extends from the horizontal stem 193 and the vertical stem 192. Liquid crystal molecules 310 are positioned between contiguous minute branches 194. Further, an extension portion 197 is further formed to extend from the pixel electrode 191 having the quadrangular shape. The extension portion 197 is physically and electrically connected with the drain electrode 175 through the contact hole 185 and receives a data voltage from the drain electrode 175.

The minute branch 194 extends obliquely from the horizontal stem 193 or the vertical stem 192. For example, in the first domain Do1, the minute branch 194 extends obliquely at a slope in a first diagonal direction Di1, and in the second domain Do2, the minute branch 194 extends obliquely at a slope in a second diagonal direction Di2. Therefore, the minute branch 194 of the first domain Do1 and the minute branch 194 of the second domain Do2 are symmetric to the vertical stem 192. However, the exemplary embodiment is not limited thereto, and the minute branch 194 of the first domain Do1 may extend obliquely in the second diagonal direction Di2 and the minute branch 194 of the second domain Do2 may extend obliquely in the first diagonal direction Di1.

Each minute branch 194 may form an angle of approximately 45° or 135° with the gate line 121 or the horizontal stem 193. Further, extension directions of the minute branches 194 of two contiguous domains Do1 and Do2 may be perpendicular to each other.

The liquid crystal layer 3 is formed on the pixel electrode 191, and the common electrode 270 is formed on the liquid crystal layer 3. The common electrode 270 may be made of a transparent metal material such as indium tin oxide (ITO) and indium zinc oxide (IZO). A constant voltage such as the common voltage is applied to the common electrode 270. When the data voltage is applied to the pixel electrode 191, an electric field is formed between the pixel electrode 191 and the common electrode 270, and the liquid crystal molecules 310 of the liquid crystal layer 3 interposed between the pixel electrode 191 and the common electrode 270 are aligned in a predetermined direction.

An overcoat 240 may be further positioned on the common electrode 270, and a light shield 220 is formed at an edge of the pixel PX on the overcoat 240. It is described that the light shield 220 is formed on the second substrate 210, but the present disclosure is not limited thereto. The light shield 220 may be formed on the first substrate 110. In this case, the light shield 220 may be formed on the passivation layer 180.

Figure 5:
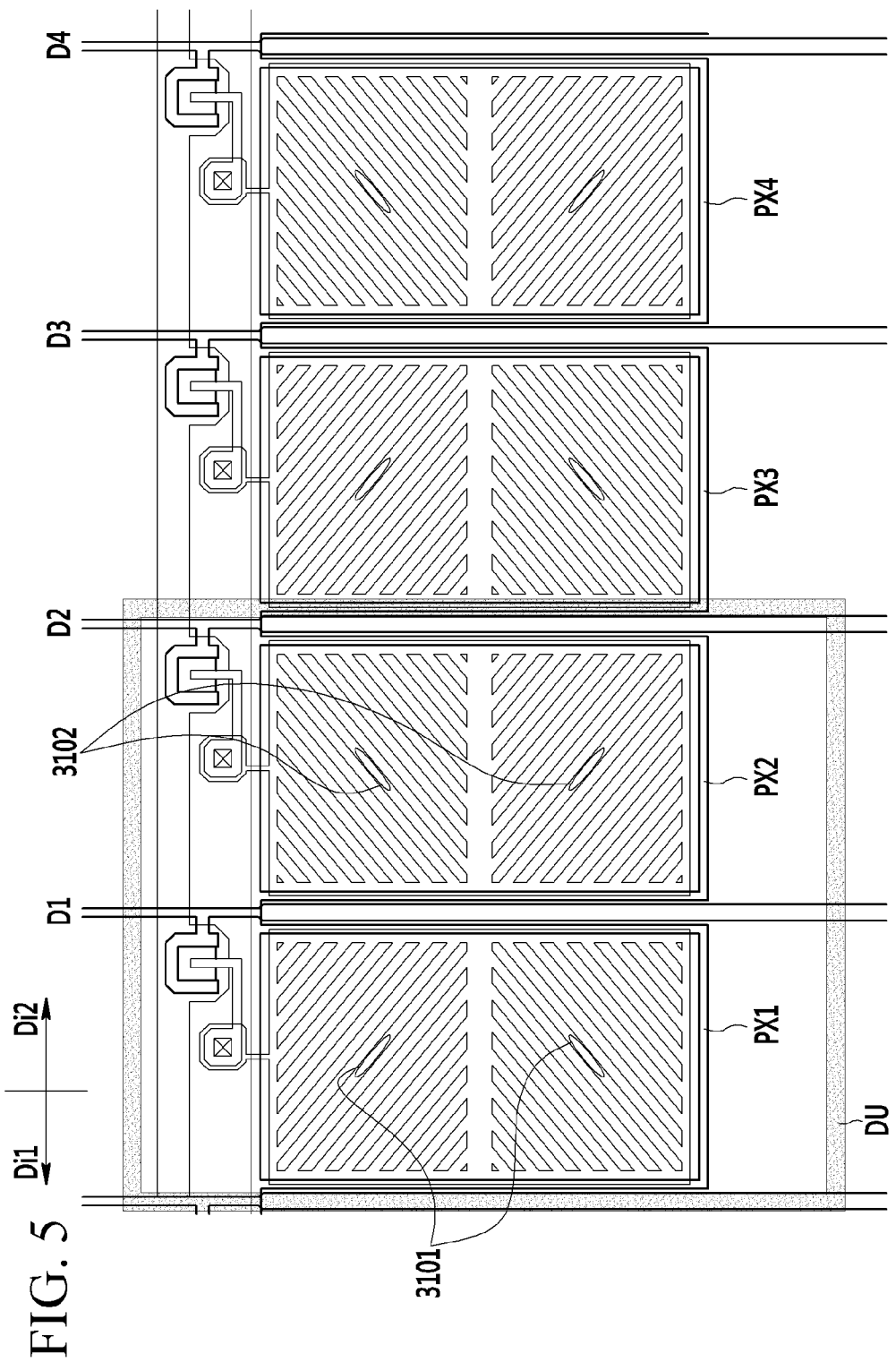
FIG. 5 illustrates an array of the pixel, according to the exemplary embodiment.
Figure 6:
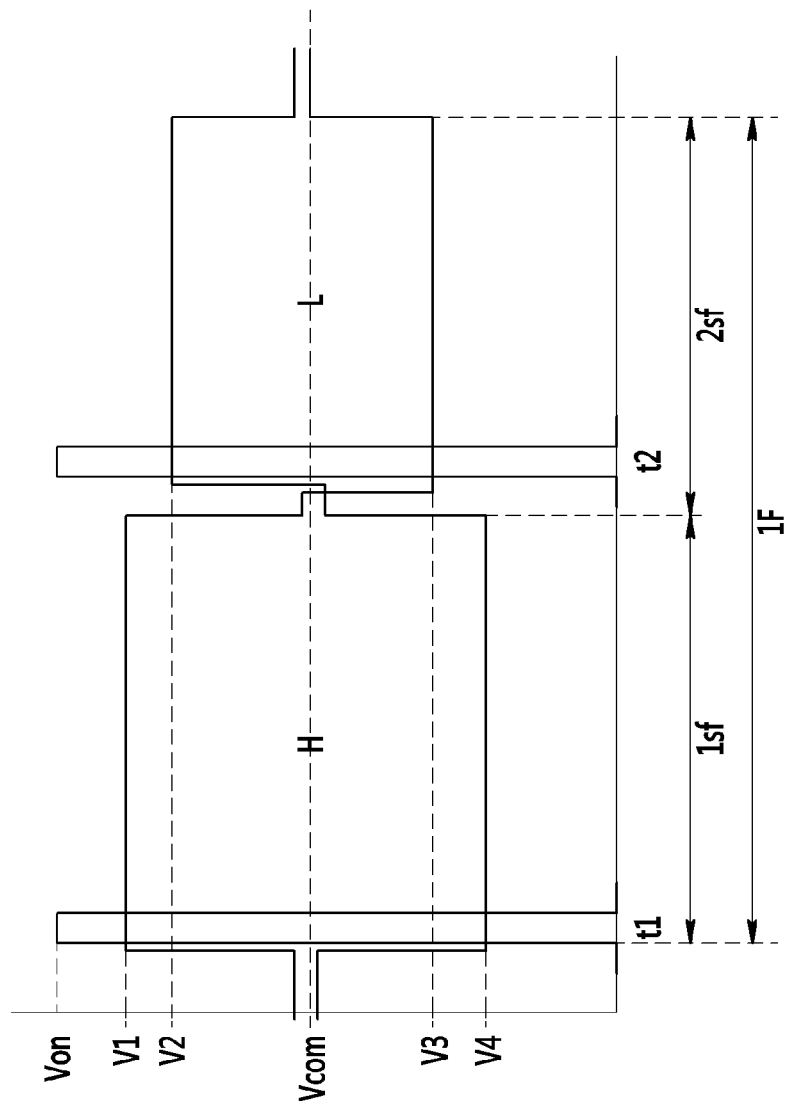
FIG. 6 illustrates a driving signal of the pixel, according to the exemplary embodiment.

FIG. 5 illustrates an array of the pixel, according to the exemplary embodiment. FIG. 6 illustrates a driving signal of the pixel, according to the exemplary embodiment. Hereinafter, driving of the pixel according to the exemplary embodiment will be described with reference to FIGS. 5 and 6.

Referring to FIG. 5, a plurality of pixels PX1 to PX4 are connected to corresponding data lines among a plurality of data lines D1 to D4, to receive data voltages, respectively. Pixels positioned in the same column are connected to the same data line.

A first pixel PX1 and a second pixel PX2 contiguous therewith form a driving unit DU. Liquid crystal molecules 3101 of the first pixel PX1 and liquid crystal molecules 3102 of the second pixel PX2 are bilaterally symmetric to each other. For example, the first pixel PX1 receives the data voltage through the data line D1, and the second pixel PX2 receives the data voltage through the data line D2. The driving unit DU applies the corresponding data voltages to the first pixel PX1 and the second pixel PX2, respectively, according to the same gate-on signal.

The liquid crystal molecules 3101 of the first pixel PX1 are laid in the first direction Di1, and the liquid crystal molecules 3102 of the second pixel PX2 are laid in the second direction Di2. The driving unit DU is simultaneously driven, therefore side visibilities in the first direction Di1 and the second direction Di2 are improved.

It is described that the driving unit DU illustrated in FIG. 5 is set as bilaterally contiguous pixels, but the exemplary embodiment is not limited thereto, and the driving unit DU may be set as vertically contiguous or diagonally contiguous plural pixels. However, even in this case, in the plurality of pixels included in the driving unit, laying directions of the contiguous pixels and the liquid crystal molecules may be different from each other.

Referring to FIG. 6, one frame period 1F includes two subframe periods 1sf and 2sf. During one frame period 1F, the driving unit DU of FIG. 5 is driven at different gray values. The data voltages include a positive data voltage and a negative data voltage. The positive data voltage has a higher value than the common voltage Vcom, and the negative data voltage has a lower value than the reference voltage.

During the first subframe period 1sf, a difference between the positive data voltage and the negative data voltage, and the common voltage Vcom is large, and a high gray H is expressed. During the second subframe period 2sf, the difference between the positive data voltage and the negative data voltage, and the common voltage Vcom is smaller than that during the first subframe period 1sf, and a low gray L is expressed.

First, at a time t1, as a gate-on voltage Von having an enable level is applied to a gate line corresponding to the pixel PX1, a positive first data voltage V1 is applied to the pixel PX1. Further, at the time t1, as the gate-on voltage Von having the enable level is applied to a gate line corresponding to the pixel PX2, a negative fourth data voltage V4 is applied to the pixel PX2.

Thereafter, at a time t2, as the gate-on voltage Von having the enable level is applied to the gate line corresponding to the pixel PX1, a negative third data voltage V3 is applied to the pixel PX1. Further, at the time t2, as the gate-on voltage Von having the enable level is applied to the gate line corresponding to the pixel PX2, a positive second data voltage V2 is applied to the pixel PX2.

Therefore, the driving unit DU of FIG. 5 is driven at the high gray H during the first subframe period 1sf and at the low gray L during the second subframe period 2sf. Therefore, the high-gray (H) and low-gray (L) side visibilities in the first direction Di1 and the second direction Di2 are improved.

When a viewer views a display device including unit pixels designed in 100 μm×300 μm away by a visibility distance of 40 cm, a threshold time resolution to distinguish contiguous unit pixels is 0.014° or less. Therefore, for a viewing angle being 0.03° or less, the unit pixels are perceived by the same visual cell on the viewer's retina, therefore the unit pixels (for example, individual RGB pixels) may not be distinguishable.

Since the pixels PX1 and PX2 of the display device 1 according to the exemplary embodiment are configured to include only one semiconductor 154, the sizes of the pixels may be reduced. Therefore, when the pixels PX1 and PX2 are designed in a size of 50 μm×150 μm, the contiguous pixels PX1 and PX2 may not be distinguishable to implement a large-area and high-resolution display device.

Figure 7:
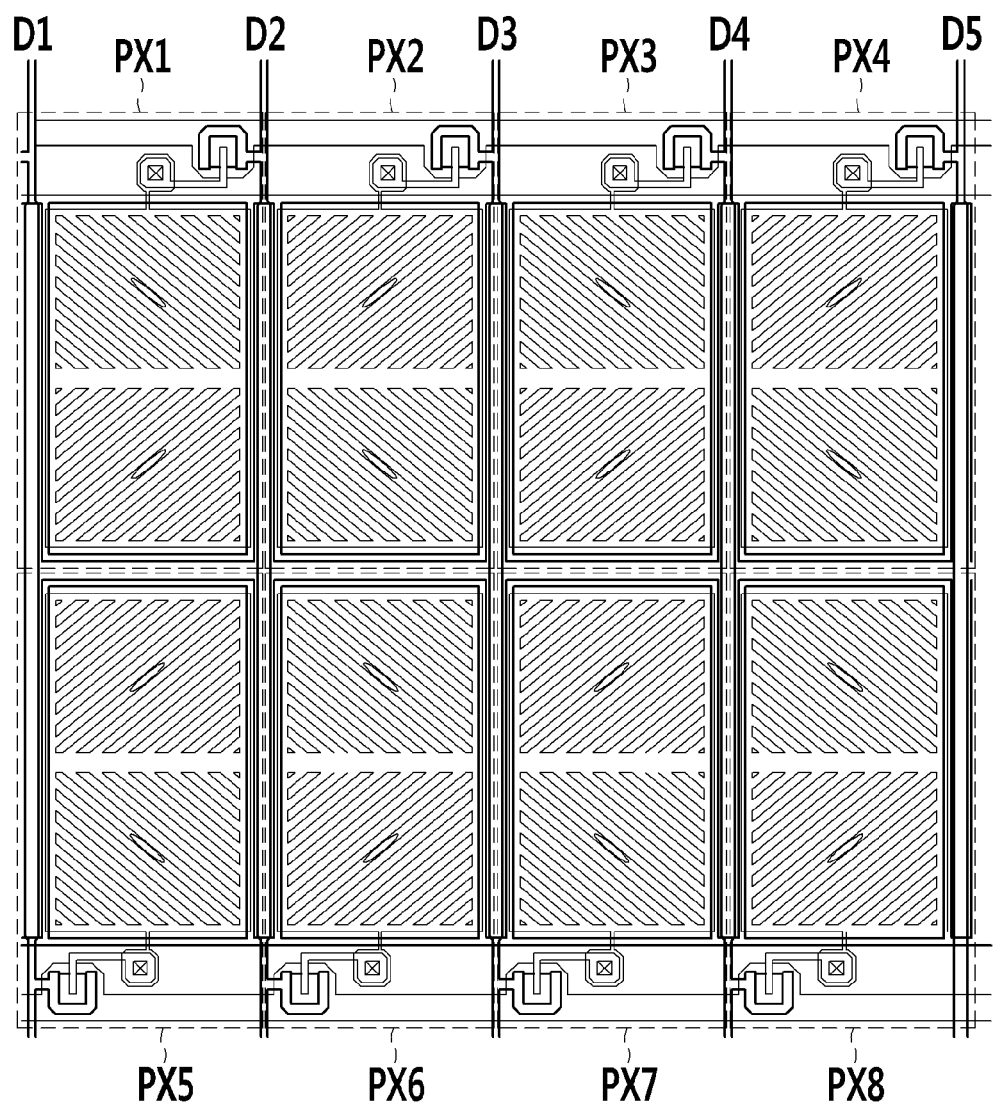
FIG. 7 illustrates an array of a pixel, according to another exemplary embodiment.

FIG. 7 illustrates an array of a pixel, according to another exemplary embodiment. Hereinafter, the array of the pixel according to another exemplary embodiment will be described with reference to FIG. 7.

The array of the pixel illustrated in FIG. 7 is different from the array of illustrated in FIG. 5 in terms of the array of the data line. Like reference numerals refer to like elements and a detailed description thereof will be omitted.

Referring to FIG. 7, a plurality of pixels PX1 to PX4 are respectively connected to corresponding data lines D2 to D5 among a plurality of data lines, and a plurality of pixels PX5 to PX8 are respectively connected to corresponding data lines D1 to D5 among the plurality of data lines. The array of the pixel is configured so that the same data line is connected to pixels contiguous diagonally around a predetermined data line.

In detail, the data line D1 is connected to the pixel PX5, and the data line D2 is connected to the pixels PX1 and PX6. Further, the data line D3 is connected to the pixels PX2 and PX7, and the data line D4 is connected to the pixels PX3 and PX8. The data line D5 is connected to the pixel PX4.

It is illustrated that the same data line is connected to pixels contiguous in a left diagonal direction in FIG. 7, but another exemplary embodiment is not limited thereto, and the same data line may be connected to pixels contiguous in a right diagonal direction. The driving signal of the pixel according to another exemplary embodiment is the same as the driving signal according to the exemplary embodiment described with reference to FIG. 6.

While the present disclosure has been described in connection with what is presently considered to be practical exemplary embodiments, it is understood that the present disclosure is not limited to the disclosed embodiments, but, on the contrary, is intended to cover various modifications and equivalent arrangements included within the spirit and scope of the present disclosure. Accordingly, the detailed description should not be limited in all aspects and should be exemplarily considered. The scope of the present disclosure should be decided by rational interpretation and changes are included in the scope of the present disclosure within an equivalent scope of the present disclosure.

DESCRIPTION OF SYMBOLS

1: Display device
300: Display unit
400: Gate driver
500: Data driver
600: Signal controller
800: Gray voltage generator
DU: Driving unit
PX1: First pixel
PX2: Second pixel

What is claimed is:

1. A display device comprising:
a plurality of pixels including a first pixel and a second pixel; and
a common electrode,
wherein each pixel of the plurality of pixels comprises a pixel electrode that includes a horizontal stem, a vertical stem, and a branch;
wherein the branch includes:
a first branch that extends in a first diagonal direction from the horizontal stem and the vertical stem; and
a second branch that extends in a second diagonal direction from the horizontal stem and the vertical stem,
wherein:
a common voltage is applied to the common electrode during one frame period including a first subframe period and a second subframe period,
the first pixel is applied with a first data voltage during the first subframe period and a third data voltage during the second subframe period,
the second pixel is applied with a fourth data voltage during the first subframe period and a second data voltage during the second subframe period,
the first data voltage and the second data voltage are positive voltages higher than a common voltage, and
the third data voltage and the fourth data voltage are negative voltages lower than the common voltage.

2. The display device of claim 1, further comprising:
a liquid crystal layer positioned between the common electrode and the pixel electrode and including a plurality of liquid crystal molecules,
wherein an electric field corresponding to a difference between the common voltage that is applied to the common electrode and the data voltage that is applied to the pixel electrode is formed in the liquid crystal layer, and
wherein the plurality of liquid crystal molecules are aligned in a direction according to the electric field.

3. The display device of claim 2, wherein:
the branch further includes:
a first domain in which the plurality of liquid crystal molecules corresponding to the first branch are laid in the first diagonal direction; and
a second domain in which the plurality of liquid crystal molecules corresponding to the second branch are laid in the second diagonal direction.

4. The display device of claim 3, wherein:
a first group of liquid crystal molecules of the first pixel and a second group of liquid crystal molecules of the second pixel are bilaterally symmetric to each other
the first pixel is connected to a first data line, and
the second pixel is connected to a second data line.

5. The display device of claim 1, wherein:
a high-gray image is displayed during the first subframe period, and
a low-gray image is displayed during the second subframe period.

6. The display device of claim 1, wherein:
a size of the pixel is 50 μm wide and 150 μm long.

7. A display device comprising:
a plurality of pixels including a first pixel and a second pixel; and
a common electrode,
wherein each pixel of the plurality of pixels comprises a pixel electrode that includes a horizontal stem, a vertical stem, and a branch,
wherein the branch includes a first branch that extends in a first diagonal direction from the horizontal stem and the vertical stem and a second branch that extends in a second diagonal direction from the horizontal stem and the vertical stem,
wherein:
a first group of liquid crystal molecules of the first pixel and a second group of liquid crystal molecules of the second pixel are vertically symmetric to each other,
the first pixel is connected to a second data line,
the second pixel is connected to a first data line, and
a common voltage is applied to the common electrode during one frame period,
a first data voltage is applied to the first pixel from the second data line according to a first gate signal, and
a second data voltage is applied to the second pixel from the first data line according to a second gate signal.

8. A method for driving a display device, wherein the display device includes a plurality of pixels including a first pixel and a second pixel, a common electrode, wherein each pixel of the plurality of pixels comprises a pixel electrode that includes a horizontal stem, a vertical stem, and a branch, and wherein the branch includes a first branch that extends in a first diagonal direction from the horizontal stem and the vertical stem and a second branch that extends in a second diagonal direction from the horizontal stem and the vertical stem,
the method comprising:
applying a common voltage to the common electrode during one frame period; and
applying a data voltage to the pixel electrode,
during a first subframe period of the one frame period, applying a first data voltage to the first pixel; and
applying a fourth data voltage to the second pixel, and
during a second subframe period of the one frame period, applying a third data voltage to the first pixel; and
applying a second data voltage to the second pixel,
wherein the first data voltage and the second data voltage are positive voltages higher than the common voltage, and the third data voltage and the fourth data voltage are negative voltages lower than the common voltage.

9. The method of claim 8, further comprising:
wherein the display device further includes a liquid crystal layer positioned between the common electrode and the pixel electrode and including a plurality of liquid crystal molecules,
forming in the liquid crystal layer an electric field corresponding to a difference between the common voltage and the data voltage; and
aligning the plurality of liquid crystal molecules in a direction according to the electric field.

10. The method of claim 9, wherein:
the branch includes:
a first domain in which the plurality of liquid crystal molecules corresponding to the first branch are laid in the first diagonal direction; and
a second domain in which the plurality of liquid crystal molecules corresponding to the second branch are laid in the second diagonal direction.

11. The method of claim 10, wherein:
a first group of liquid crystal molecules of the first pixel and a second group of liquid crystal molecules of the second pixel are bilaterally symmetric to each other, the first pixel is connected to a first data line, and the second pixel is connected to a second data line.

12. The method of claim 8, further comprising:
displaying a high-gray image during the first subframe period; and
displaying a low-gray image during the second subframe period.

13. The method of claim 8, wherein:
a size of the pixel is 50 μm wide and 150 μm long.

14. A method for driving a display device, wherein the display device includes a plurality of pixels including a first pixel and a second pixel, and a common electrode, wherein each pixel of the plurality of pixels comprises a pixel electrode that includes a horizontal stem, a vertical stem, and a branch, wherein the branch includes a first branch that extends in a first diagonal direction from the horizontal stem and the vertical stem and a second branch that extends in a second diagonal direction from the horizontal stem and the vertical stem, wherein a first group of liquid crystal molecules of the first pixel and a second group of liquid crystal molecules of the second pixel are vertically symmetric to each other, the first pixel is connected to a second data line, and the second pixel is connected to a first data line,
the method comprising:
applying a common voltage to the common electrode during one frame period;
applying a first data voltage to the first pixel from the second data line according to a first gate signal, and
applying a second data voltage to the second pixel from the first data line according to a second gate signal.

* * * * *